United States Patent
Hardman et al.

(10) Patent No.: US 12,188,404 B1
(45) Date of Patent: Jan. 7, 2025

(54) ELECTRIC TURBOCHARGER EMISSIONS CONTROL

(71) Applicant: FCA US LLC, Auburn Hills, MI (US)

(72) Inventors: Kenneth E Hardman, Clarkston, MI (US); Ryan M Sturgeon, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/544,510

(22) Filed: Dec. 19, 2023

(51) Int. Cl.
*F02B 37/04* (2006.01)
*F02B 37/18* (2006.01)
*F02D 23/00* (2006.01)

(52) U.S. Cl.
CPC .............. *F02B 37/18* (2013.01); *F02B 37/04* (2013.01); *F02D 23/00* (2013.01)

(58) Field of Classification Search
CPC .......... F02B 37/18; F02B 37/04; F02B 37/10; F02B 39/10; F02D 23/00; F02D 41/0007; F01N 5/04; F01N 2410/00; Y02T 10/12; Y02T 10/40
See application file for complete search history.

(56) References Cited

U.S. PATENT DOCUMENTS

| | | | |
|---|---|---|---|
| 2014/0060006 A1* | 3/2014 | Ruona | F01N 3/2006 60/273 |
| 2018/0058287 A1* | 3/2018 | Zhang | F01N 3/2006 |
| 2019/0120180 A1* | 4/2019 | Martin | F01N 3/2093 |
| 2019/0242296 A1* | 8/2019 | Zhang | F02B 37/10 |
| 2020/0095912 A1* | 3/2020 | Bouws | F01N 3/106 |
| 2020/0224614 A1 | 7/2020 | Hu et al. | |

* cited by examiner

*Primary Examiner* — Dapinder Singh
(74) *Attorney, Agent, or Firm* — Jeremy J. Klobucar

(57) ABSTRACT

A control system for an engine comprising an electric turbocharger and a wastegate is presented. The system is configured to variably open and close to control the flow of exhaust gas in an exhaust system of the engine at a turbine of the electric turbocharger; and a controller that obtains parameters including an exhaust flow rate through the exhaust system. The controller uses the parameters to (i) determine a desired speed of the electric turbocharger to satisfy no flow of the exhaust gas through the turbine; (ii) command the electric turbocharger to rotate in a reverse direction at the desired speed to achieve no flow of the exhaust gas through the turbine; (iii) determine whether an exhaust gas treatment system (ETS) has reached a desired temperature; and (iv) command the electric turbocharger to rotate in a forward direction based on the ETS reaching the desired temperature.

14 Claims, 3 Drawing Sheets

ELECTRIC TURBOCHARGER EMISSIONS CONTROL

FIELD

The present application generally relates to electric turbochargers and, more particularly, to techniques for operating an electric turbocharger to direct exhaust flow through a wastegate, rather than a turbine of the turbocharger, to increase heat flux in a catalyst to reduce warm up time during a cold start.

BACKGROUND

A turbocharger is a turbine-driven, forced-induction device that increases airflow into an internal combustion engine. A compressor, which is driven by a turbine, draws in ambient air and compresses it before it enters the engine at an increased pressure. This results in a greater mass of air entering cylinders of the engine on each intake stroke, which increases the engine's efficiency through decreased throttling losses and increases the engine's power output. Kinetic energy of exhaust gas produced by combustion of the air and a fuel within the cylinders is then utilized to drive the turbine of the turbocharger.

Some turbocharger systems include electric turbochargers. An electric turbocharger includes an electric motor that rotates a turbo shaft that in turn drives the compressor. The electric motor is powered by a battery system. During a cold start it is desirable to quickly warm up a catalyst in the exhaust system to raise the catalyst to an operating temperature that more effectively reduces emissions. Exhaust flow from the engine typically flows at least partially through the turbine of the electric turbocharger. In general, the exhaust flow that flows through the electric turbocharger warms up the housing of the turbocharger representing heat lost that could otherwise be used to heat up the catalyst. Accordingly, while such turbocharger systems work for their intended purpose, there remains a need for improvement in the relevant art.

SUMMARY

According to one example aspect of the invention, a control system for an engine comprising an electric turbocharger is presented. In one exemplary implementation, the system comprises a wastegate system having a wastegate valve configured to variably open and close to control the flow of exhaust gas in an exhaust system of the engine at a turbine of the electric turbocharger; and a controller configured to: obtain a set of parameters including an exhaust flow rate through the exhaust system. The controller uses the set of parameters to (i) determine a desired speed of the electric turbocharger to satisfy no flow of the exhaust gas through the turbine; (ii) command the electric turbocharger to rotate in a reverse direction at the desired speed to achieve no flow of the exhaust gas through the turbine; (iii) determine whether an exhaust gas treatment system (ETS) has reached a desired temperature; and (iv) command the electric turbocharger to rotate in a forward direction based on the ETS reaching the desired temperature.

In some implementations, commanding the electric turbocharger to rotate in a reverse direction at the desired speed to achieve no flow of the exhaust gas through the turbine comprises rerouting the exhaust through the wastegate system.

In some implementations, the controller is further configured to command a compressor bypass valve open to allow airflow to bypass a compressor of the electric turbocharger and into the engine.

In some implementations, the set of parameters further includes engine speed.

In other implementations, the set of parameters further includes airflow through the engine.

In additional implementations, the ETS comprises a particulate filter.

In implementations, the controller is further configured to determine whether oil pressure of the engine has reached an acceptable level prior to commanding the electric turbocharger to rotate in the reverse direction.

According to another example aspect of the invention, a method of controlling an engine comprising an electric turbocharger and a wastegate system that selectively bypasses exhaust gas from a turbine of the electric turbocharger is presented. In one exemplary implementation, the method comprises obtaining a set of parameters including an exhaust flow rate through an exhaust system of the engine. Based on the set of parameters, a desired speed of the electric turbocharger is determined to satisfy no flow of the exhaust gas through the turbine. The electric turbocharger is commanded to rotate in a reverse direction at the desired speed to achieve no flow of the exhaust gas through the turbine. A determination is made whether an exhaust gas treatment system (ETS) has reached a desired temperature. The electric turbocharger is commanded to rotate in a forward direction based on the ETS reaching the desired temperature.

In some implementations, the method further includes commanding a compressor bypass valve open to allow airflow to bypass a compressor of the electric turbocharger and into the engine.

In some implementations, the set of parameters further includes engine speed.

In other implementations, the set of parameters further includes airflow through the engine.

In additional implementations, the ETS further comprises a particulate filter.

In additional implementations, the method includes determining whether oil pressure of the engine has reached an acceptable level prior to commanding the electric turbocharger to rotate in the reverse direction.

In additional implementations, commanding the electric turbocharger to rotate in a reverse direction at the desired speed to achieve no flow of the exhaust gas through the turbine comprises rerouting the exhaust gas through the wastegate system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Vehicle turbocharger systems are configured to perform "boost control." Boost control aims to achieve an engine airflow demand (based on a driver's torque request) via positioning of a wastegate valve. The wastegate valve position, however, must change in response to not only airflow demand changes, but also in response to changes in operating conditions when airflow demand is unchanging. Non-limiting examples of these operating conditions include ambient air temperature, compressor inlet pressure (altitude changes), exhaust gas recirculation (EGR) configuration (e.g., low pressure vs. high pressure), throttle inlet pressure (TIP) reserve, spark timing, air/fuel ratio, and exhaust gas temperature. As mentioned above, some turbocharger systems include electric turbochargers. An electric turbocharger includes an electric motor that rotates a turbo shaft that in turn drives the compressor and turbine wheels. The electric motor is powered by a battery system.

The control techniques described herein direct exhaust flow through a wastegate, rather than a turbine of the turbocharger, to increase heat flux to a catalyst to reduce warm up time of the catalyst during a cold start. At cold start, the control system commands the electric turbocharger to rotate backwards (in a direction into the exhaust flow coming from the engine) to ultimately achieve no exhaust flow through the turbine. As the exhaust flow now goes through the wastegate system (and not the turbine) and subsequently into the catalyst, heat loss to the turbine and housing of the turbocharger is reduced and more heat is utilized for heating up the catalyst. Once a temperature of the catalyst is raised to a satisfactory temperature, control commands the electric turbocharger to rotate in a forward direction whereby normal operation of the turbocharger can proceed.

Figure 1:
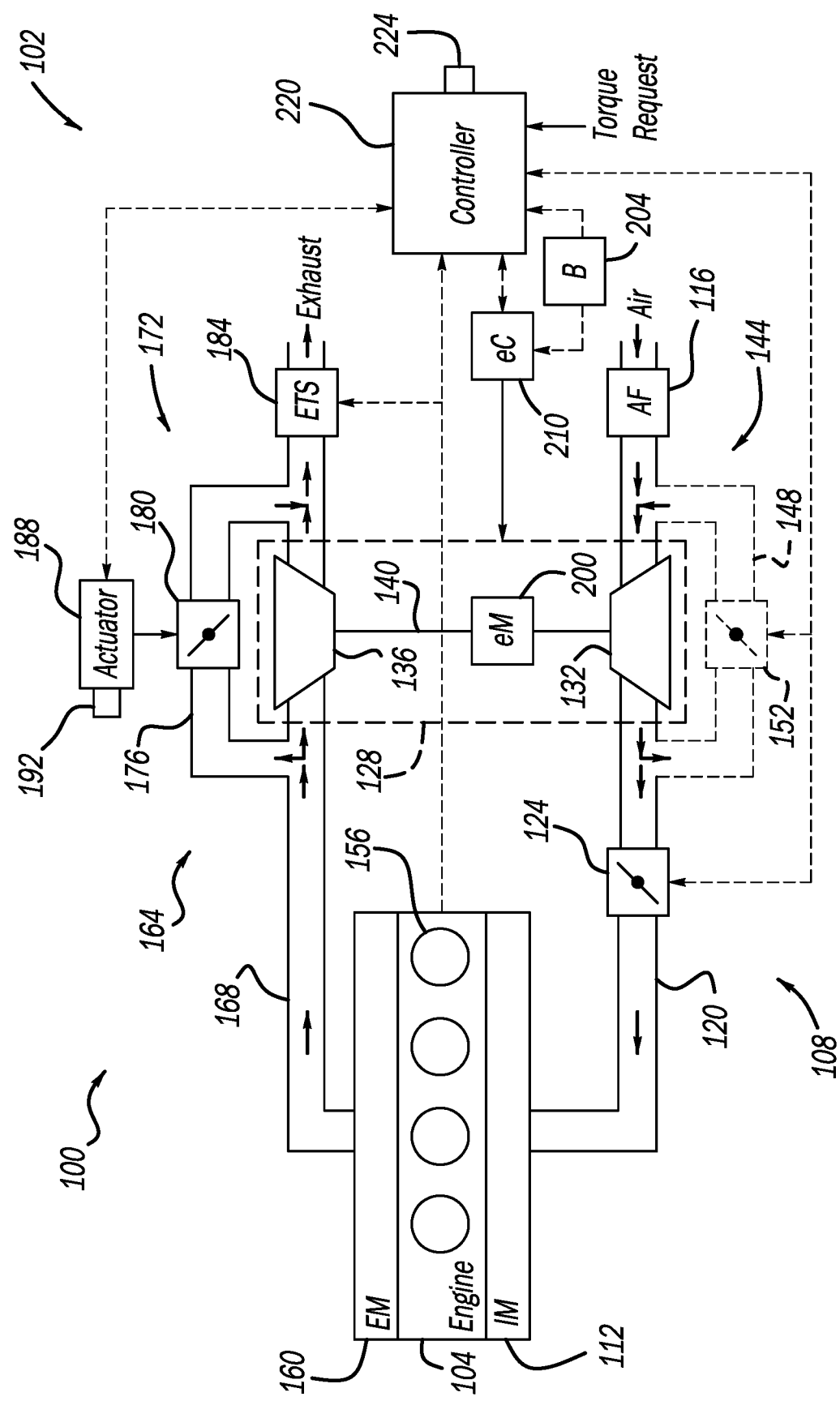
FIG. 1 is a diagram of an example vehicle comprising an electric turbocharger engine according to the principles of the present disclosure.

Referring now to FIG. 1, a diagram of an example vehicle 100 is illustrated. The vehicle 100 is controlled by a vehicle control system 102. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140. The intake system 108 optionally comprises a recirculation system 144 comprising a recirculation passage 148 and a recirculation valve 152 for selectively bypassing the compressor 132.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104. The present teachings can be applicable to a spark ignited engine or a compression ignited (diesel) engine.

The exhaust gas from the exhaust manifold 160 is provided to an exhaust system 164 comprising an exhaust passage 168. Exhaust energy of the exhaust gas drives the turbine 136, which in turn drives the compressor 132 via the shaft 140. A wastegate system 172 selectively bypasses the turbine 136 to regulate boost pressure (e.g., exhaust gas flow at an inlet of the turbine 136). The wastegate system 172 comprises a bypass passage 176 and a wastegate valve 180 that regulates the flow of exhaust gas through an orifice (e.g., the bypass passage 176).

An exhaust gas treatment system (ETS) 184, such as a catalytic converter, treats exhaust gas to decrease or eliminate emissions before it is released into the atmosphere. The ETS 184 can be configured in many ways and can include a particular filter. In one exemplary implementation, the wastegate valve 180 is electrically-actuated by an electric actuator 188 (e.g., an electric motor that displaces an arm coupled to the wastegate valve 180) that also has an associated position sensor 192.

The turbocharger 128 can be further configured as an electric turbocharger having an electric motor 200 that rotates the shaft 140 that in turn drives the compressor 132. The electric motor 200 is powered by a battery system 204 based on signals from an electric turbocharger controller 210. In examples the battery system 204 is a high voltage source, such as a 48 volt source that supplies energy for the electric motor 200 to drive the compressor 132. In other modes, the electric motor 200 can operate in a regeneration mode where rotational energy from the electric motor 200 can be used to charge the battery system 204 or deliver electric power to a transmission or axle drive motor.

The vehicle control system 102 includes a controller, also referred to herein as an engine controller, 220 that controls operation of the vehicle 100. Examples of components controlled by the controller 220 include the engine 104, the throttle valve 124, the optional recirculation valve 152, the wastegate valve 180 (e.g., via electric actuator 188), and the exhaust treatment system 184. It will be appreciated that the controller 220 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 220 controls operation of these various components based on measured and/or modeled parameters. A set of one or more sensors 224 are configured to measure one or more parameters (pressures, temperatures, speeds, etc.) as discussed in greater detail herein. Other parameters could be modeled by the controller 220, e.g., based on other measured parameters. The controller 220 is also configured to perform the engine/turbocharger control techniques of the present disclosure, which are discussed in greater detail below.

At cold start of the engine 104, and after oil pressure raises to an acceptable level, the controller 220 commands a negative torque into the turbocharger shaft 140 to rotate the turbocharger shaft 140 backwards (in a direction into the exhaust flow). Such reverse rotation effectively blocks exhaust flow through the turbine 136 and forces the exhaust flow instead through the bypass passage 176 of the wastegate system 172. As the exhaust flow now goes through the wastegate system 172 and into the ETS 184, heat loss to the turbine 136 (and housing of the turbocharger 128) is reduced and more heat is utilized for heating up the ETS 184 (catalyst). For comparison, some conventional control systems having a turbocharger during normal operating conditions can direct around 40% of the exhaust flow through the wastegate system 172 and a remainder to the turbocharger.

The compressor bypass valve 152 can also be opened to allow airflow to bypass the compressor 132 and into the engine 104. Once the ETS 184 is up to a satisfactory temperature, the controller 220 commands the electric motor 200 to output a positive torque on the turbocharger shaft 140 to start the turbocharger 128 rotating in the normal direction (with the exhaust flow) and the engine 104 returns to normal operation.

The controller 220 communicates parameters such as, but not limited to, a turbo speed target, a motor speed target and a motor power limit to the electric turbocharger controller 210. The electric turbocharger controller 210 communicates parameters such as, but not limited to, a turbine speed feedback, a voltage of the battery system 204 and temperatures to the electric turbocharger controller 210. In this regard, the engine controller 220 communicates with the electric turbocharger controller 210 sending speed and torque targets to the electric motor 200 and receives feedback speeds and temperatures. The battery system 204 communicates parameters such as, but not limited to, a battery state of charge (SOC) and a power/current limit to the electric turbocharger controller 210 and the engine controller 220. In this regard, the battery system 204 sends battery SOC, power limits and other parameters to the engine controller 220 and the electric turbocharger controller 210 to limit power of the electric motor 200. It is appreciated that various controller functions described herein can be performed by either of the engine controller 220 and the electric turbocharger controller 210.

Figure 2:
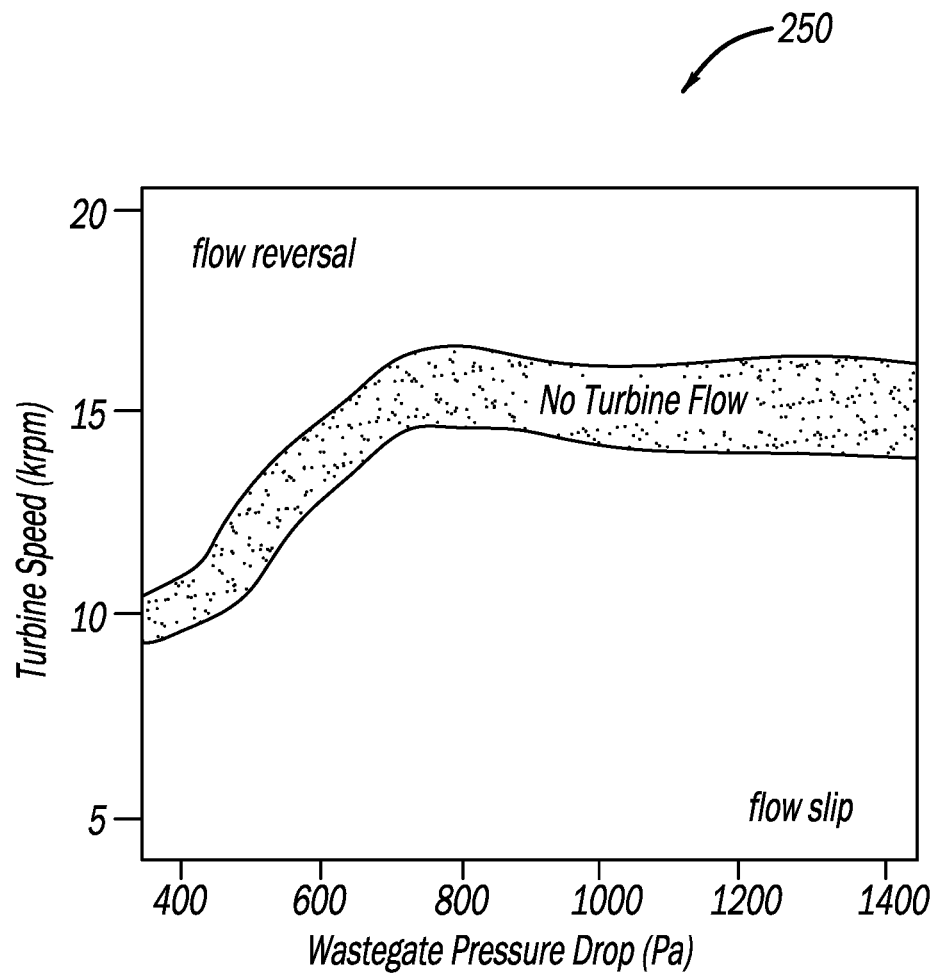
FIG. 2 is an exemplary plot illustrating wastegate pressure drop versus turbine speed according to the principles of the present disclosure.

As shown in FIG. 2, a plot 250 illustrating wastegate pressure drop versus turbine speed according to the principles of the present disclosure is shown. As turbine speed is increased, wastegate pressure drop also increases. The flow can be optimized by the vehicle control system 102 to provide an optimal reverse speed of the turbine to achieve the most effective result.

Figure 3:
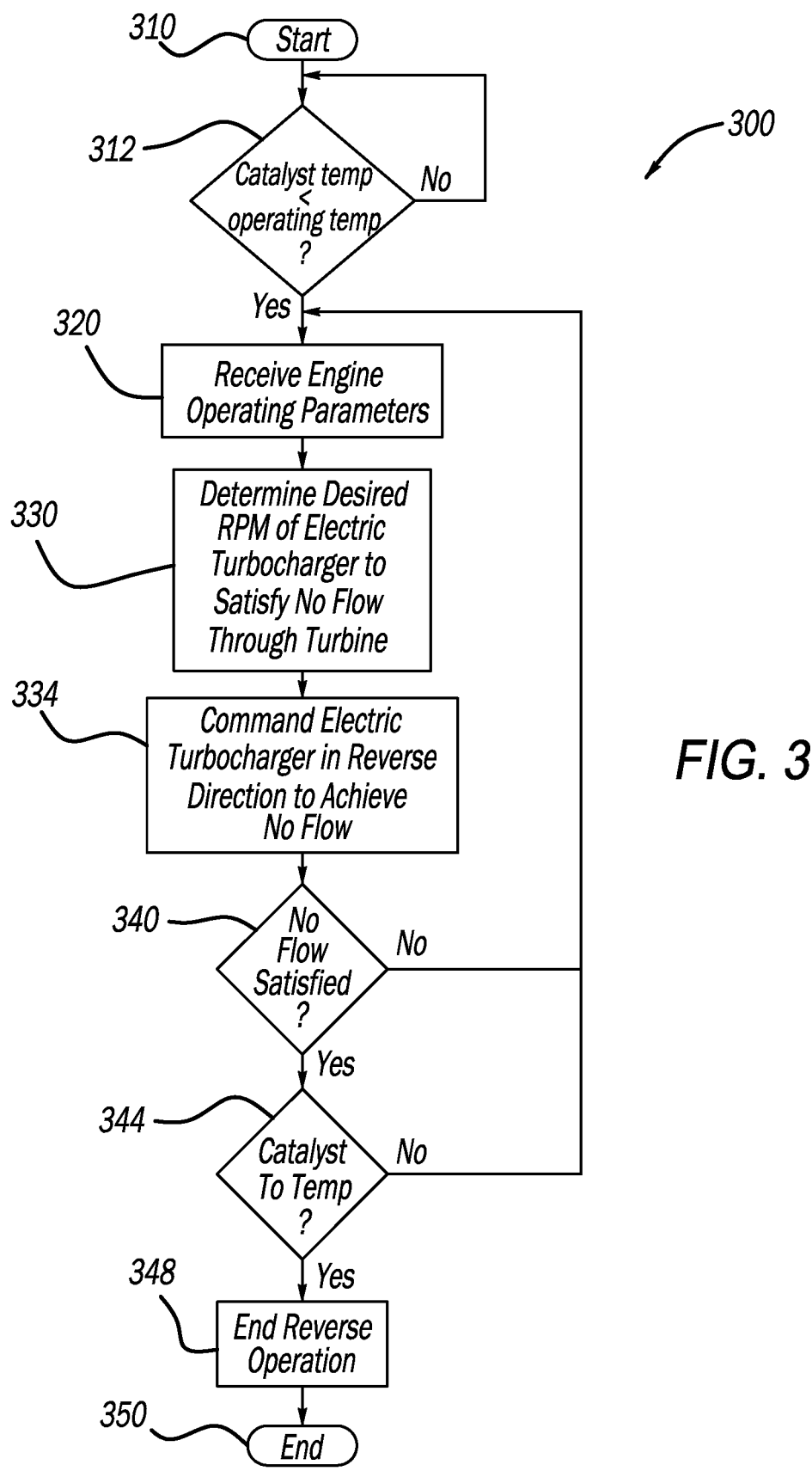
FIG. 3 is a flow diagram of an example method of operating the electric turbocharger engine according to the principles of the present disclosure.

Referring now to FIG. 3, a flow chart of an example method 300 of operating the engine 104 having the electronic turbocharger 128 is illustrated. For explanatory purposes, components of the vehicle 100 will be referenced, but it will be appreciated that this method 300 could be used for any engine having an electric turbocharger. Control begins at 310. At 312 control determines whether the catalyst temperature is less than an operating temperature. As discussed, the reverse flow is useful when the catalyst is not to an operating temperature. In some examples where the engine is not cold and the catalyst temperature is low, the reverse flow sequence can also be used. As discussed below, any feedback measurements of the vehicle control system 102 communicated to the controller 220 can be provided by the sensors 224.

If the catalyst temperature is not less than operating temperature, control loops to 312. If control determines that the catalyst temperature is less than operating at 312, control receives engine operating parameters at 320. Engine parameters 320 can include any engine parameters useful for operating the turbocharger 128 at an optimal reverse speed such as, but not limited to, engine speed, electric turbocharger speed and direction, airflow through the induction passage 120, airflow through the exhaust passage 168, and temperature of the ETS 184.

At 330 control determines a desired (or target) RPM of the electric turbocharger 128 to satisfy no flow through the turbine 136. As used herein, "no flow" is used to denote a zero or near zero flow. The reverse rotation speed of the electric turbocharger 128 during heating of the ETS 184 depends on the exhaust flow rate out of the engine 104 which depends upon the speed of the engine 104 and the airflow through the engine 104. An open loop control technique can be used to determine the target reverse speed of the electric turbocharger 128 during heating of the ETS 184. At 334, control commands the electric turbocharger to operate in a reverse direction (against the flow of the exhaust flowing through the exhaust passage 168) at the target reverse speed to achieve no flow through the turbine 136.

At 340 control determines whether no flow is satisfied. In examples, the reverse turbocharger speed will be controlled open loop with a map developed through testing (such as dynamometer testing). If no flow is not satisfied at 340, control loops to 320. If no flow has been satisfied, control determines whether the ETS 184 (catalyst) has reached satisfactory operating temperature. If a satisfactory operating temperature of the catalyst has not been reached at 344, control loops to 320. If a satisfactory operating temperature of the catalyst has been reached at 344 control ends at 350.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine having an electric turbocharger, the control system comprising:
    a wastegate system having a wastegate valve configured to variably open and close to control a flow of exhaust gas in an exhaust system of the engine at a turbine of the electric turbocharger; and
    a controller configured to:
        obtain a set of parameters including an exhaust flow rate through the exhaust system;
        using the set of parameters:
            (i) determine, based on the exhaust flow rate through the exhaust system, a desired speed of the electric turbocharger to satisfy no flow of the exhaust gas through the turbine;
            (ii) command the electric turbocharger to rotate in a reverse direction at the desired speed to achieve no flow of the exhaust gas through the turbine;

(iii) determine whether an exhaust gas treatment system (ETS) has reached a desired temperature; and (iv) command the electric turbocharger to rotate in a forward direction based on the ETS reaching the desired temperature.

2. The system of claim 1, wherein commanding the electric turbocharger to rotate in a reverse direction at the desired speed to achieve no flow of the exhaust gas through the turbine comprises rerouting the exhaust through the wastegate system.

3. The system of claim 1, wherein the controller is further configured to command a compressor bypass valve open to allow airflow to bypass a compressor of the electric turbocharger and into the engine.

4. The system of claim 3, wherein the set of parameters further includes engine speed.

5. The system of claim 4, wherein the set of parameters further includes airflow through the engine.

6. The system of claim 1, wherein the ETS further comprises a particulate filter.

7. The system of claim 1, wherein the controller is further configured to determine whether oil pressure of the engine has reached an acceptable level prior to commanding the electric turbocharger to rotate in the reverse direction.

8. A method for controlling an engine having an electric turbocharger and a wastegate system that selectively bypasses exhaust gas from a turbine of the electric turbocharger, the method comprising:

obtaining a set of parameters including an exhaust flow rate through an exhaust system of the engine;

determining, based on the exhaust flow rate through the exhaust system, a desired speed of the electric turbocharger to satisfy no flow of the exhaust gas through the turbine;

commanding the electric turbocharger to rotate in a reverse direction at the desired speed to achieve no flow of the exhaust gas through the turbine;

determining whether an exhaust gas treatment system (ETS) has reached a desired temperature; and commanding the electric turbocharger to rotate in a forward direction based on the ETS reaching the desired temperature.

9. The method of claim 8, further comprising:

commanding a compressor bypass valve open to allow airflow to bypass a compressor of the electric turbocharger and into the engine.

10. The method of claim 9, wherein the set of parameters further includes engine speed.

11. The method of claim 10, wherein the set of parameters further includes airflow through the engine.

12. The method of claim 8, wherein the ETS further comprises a particulate filter.

13. The method of claim 8, further comprising:

determining whether oil pressure of the engine has reached an acceptable level prior to commanding the electric turbocharger to rotate in the reverse direction.

14. The method of claim 8, wherein commanding the electric turbocharger to rotate in a reverse direction at the desired speed to achieve no flow of the exhaust gas through the turbine comprises rerouting the exhaust gas through the wastegate system.

\* \* \* \* \*